US005302018A

United States Patent [19]

Maeda

[11] Patent Number: 5,302,018

[45] Date of Patent: Apr. 12, 1994

[54] CONCRETE KNEADING APPARATUS

[76] Inventor: Kenji Maeda, 4-7, Matsunoki 3-chome, Suginami-ku, Tokyo, Japan

[21] Appl. No.: 961,080

[22] Filed: Jan. 12, 1993

Related U.S. Application Data

[62] Division of Ser. No. 732,075, Jul. 18, 1991, Pat. No. 5,183,332.

[30] Foreign Application Priority Data

Mar. 26, 1991 [JP] Japan .................................. 3-086128

[51] Int. Cl.$^{5}$ .......................... B28C 5/08; B29B 7/00; B01F 11/00; B30B 7/04

[52] U.S. Cl. ........................................ 366/66; 366/96; 366/117; 366/333; 366/334; 100/232; 425/432; 425/456

[58] Field of Search ........................ 366/66, 69, 70, 96, 366/108, 110, 256, 332, 333, 349, 2, 4–8, 117, 334; 425/425, 427, 428, 431, 432, 456; 100/232

[56] References Cited

U.S. PATENT DOCUMENTS 3,338,563 8/1967 Leling .................................... 366/8
4,463,875 8/1984 Tepic .

FOREIGN PATENT DOCUMENTS 21718 5/1947 Finland .............................. 100/232
51128 2/1989 Japan .
308603 12/1989 Japan .
40227 2/1990 Japan .
55106 2/1990 Japan .
135137 5/1990 Japan .
147205 6/1990 Japan .
180628 7/1990 Japan .
273530 11/1990 Japan .
303805 12/1990 Japan .
04170 3/1992 PCT Int'l Appl. .

*Primary Examiner*—Philip R. Coe
*Assistant Examiner*—Randall E. Chin
*Attorney, Agent, or Firm*—Knobbe, Martens, Olson & Bear

[57] ABSTRACT

The present invention aims to evenly and surely knead a concrete material comprising less water amount. Concrete material layer entered into a kneading tank is cut in an up-and-down direction and divided into a plurality of layer sections arrayed side by side along a right-and-left direction,, and one of the divided layer sections is piled up another one of the divided layer sections in the up-and-down direction, then the piled up concrete layer sections are compacted, in other words are pressed in the up-and-down direction and extended in a horizontal direction, and further these steps are repeated.

8 Claims, 6 Drawing Sheets

CONCRETE KNEADING APPARATUS

This application is a divisional of application Ser. No. 732,075, filed Jul. 18, 1991, now U.S. Pat. No. 5,183,332.

BACKGROUND OF THE INVENTION

The present invention relates to a concrete kneading apparatus, and particularly to a kneading apparatus preferable for a stiff-consistency concrete having less water.

There has been conventionally and chiefly used a concrete kneading apparatus in which an inclined mixing drum is utilized to rotate the concrete material entered inside the mixing drum so as to be stirred by virtue of the gravity which acts on the concrete itself, or a concrete kneading apparatus in which the concrete material entered into a tank or a pipe is forced to be stirred by stirring fins or wings.

In accordance with said conventional methods, however, it was difficult to evenly knead the stiff-consistency concrete material including less water amount by merely using such stirring fins or wings due to poor flowability of the stiff-consistency concrete material, though it is relatively easy to evenly stir in the case of a relatively soft concrete material comprising more water because of high flowability.

SUMMARY OF THE INVENTION

It is therefore an object of the present invention to resolve the problem in which it was difficult to evenly stir stiff-consistency concrete material comprising less water.

In order to resolve said convention problem, the present invention provides a kneading apparatus for concrete wherein a concrete material layer accommodated in a kneading tank is cut side by side in an up-and-down direction and divided into a plurality of layer sections, and one of the divided layer sections is piled upon another one of the divided layer sections in an up-and-down direction. Then, the piled up concrete layer sections are compacted; in other words, are pressed in the up-and-down direction and extended in a horizontal direction. These steps are repeated as needed.

Furthermore, the present invention provides a kneading apparatus for concrete which includes a plurality of lower pusher bodies provided adjacent to each other in a bottom portion of a kneading tank so as to be movable or to be able to reciprocate in the up-and-down direction, an upper pusher body having a pusher surface, the area of which is substantially the same as a horizontal cross-sectional area of the kneading tank and being provided on a top portion of the kneading tank so as to be movable or to be able to reciprocate in the up-and-down direction, side pusher bodies provided at upper sides of the kneading tank so as to oppose each other and to be movable or to be able to reciprocate in the horizontal direction, and rotating means for moving the lower pusher bodies, the upper pusher body and the side pusher bodies.

In this case, besides an oil cylinder device, it is possible to use a combined motor and crank as an example of each actuating device. In short, it can be any form as long as it can actuate the lower pusher bodies, the upper pusher body and the side pusher bodies so as to reciprocate in the up-and-down direction or in the horizontal direction.

In accordance with the present invention, the concrete material layer is cut side by side in the vertical, i.e., the up-and-down, direction and divided into a plurality of layer sections, and the divided layer sections are piled up in the up-and-down direction, then the piled up plurality layer sections are compacted; in other words, are pressed in the up-and-down direction and extended in the horizontal, i.e., the right-and-left, direction, whereby it becomes possible in the case of the concrete material comprising less water to evenly and certainly knead concrete.

BRIEF DESCRIPTION OF THE ACCOMPANY DRAWINGS

DETAILED DESCRIPTION OF THE PREFERRED EMBODIMENT

Figure 1:
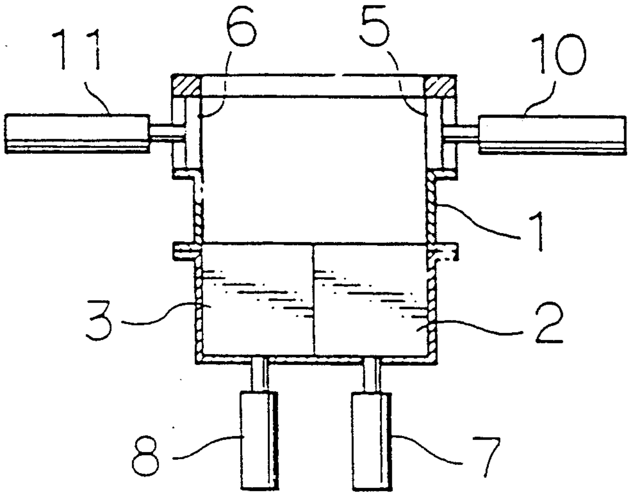
FIG. 1 is a vertical cross-sectional elevation view showing an initial condition of a kneading step in accordance with the present invention.

Referring now to drawings, the preferred embodiment of the present invention is hereinafter described in detail.

The figures show one example of a mixer for kneading concrete in accordance with the present invention. A rectangular-shaped and box-like kneading tank 1 is equipped with lower pusher bodies 2 and 3 disposed adjacent to each other in a bottom portion of the kneading tank 2 so as to be movable or to be able to reciprocate in an up-and-down direction, an upper pusher body 4 provided on a top portion of the kneading tank 1 so as to be movable or to be able to reciprocate in the up-and-down direction, and side pusher bodies 5 and 6 provided at upper sides of the kneading tank 1 so as to oppose each other and to be movable or to be able to reciprocate in a right-and-left direction.

Each of the lower pusher bodies 2 and 3 has a pusher surface which area is equal to one-half of a horizontal cross-sectional area of the kneading tank 1, and the pusher surface is disposed in such a manner that the pusher surface can be raised or lowered by a lower pusher cylinder 7 or 8 between the bottom line of the kneading tank 1 and a height corresponding to a lower edge of a passage zone in which the side pusher bodies 5 and 6 are reciprocated. The height of each of the lower pusher bodies 2 and 3 themselves is designed to be sufficiently larger than the stroke length between the bottom line of the kneading tank 1 and the height corresponding to the lower edge of the passage zone in which the side pusher bodies 5 and 6 are reciprocated, so that when one of the lower pusher bodies 2 and 3 is raised, the side surface of said one of the pusher bodies 2 and 3 can constitute a partition wall extending from the pusher surface of said one of the lower pusher bodies 2 and 3 to the pusher surface of the other of the lower pusher bodies 2 and 3.

The upper pusher body 4 has a pusher surface, the area of which is substantially equal to the horizontal cross-sectional area of the kneading tank 1, and is raised or lowered in the up-and-down direction by virtue of an upper pusher cylinder 9.

The side pusher bodies 5 and 6 respectively have a pusher surface, the area of which is substantially equal to the upper half of the vertical cross-sectional area of the kneading tank 1, being equally divided into two parts in the up-and-down direction, and are set to move back and forth in the horizontal direction from the side edge of the kneading tank 1 to the midway of the kneading tank 1 by virtue of the force of side pusher cylinders 10 and 11.

The upper pusher body 4 can be equipped with a vibration machine 12 on its top surface if necessary so as to facilitate mashing the concrete securely and finely by applying vibration at the same time during mashing.

Figure 2:
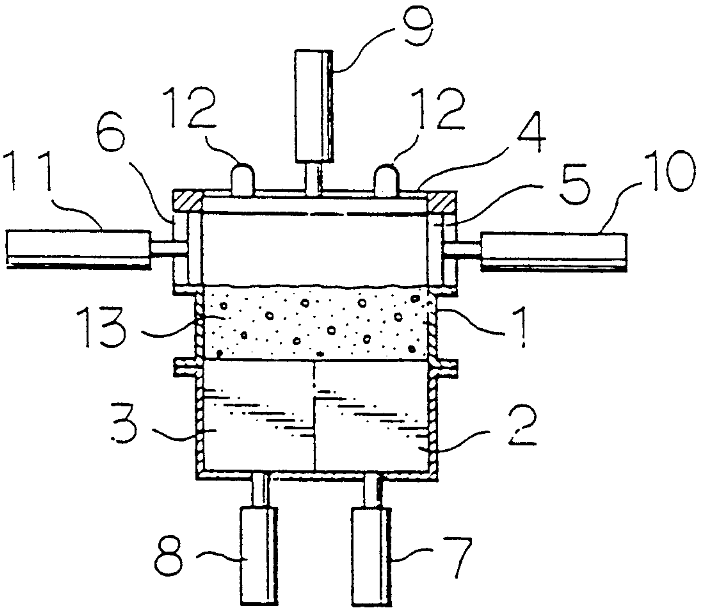
FIG. 2 is a vertical cross-sectional elevation view showing one state of the kneading step in accordance with the present invention.

With the arrangement of the kneading tank 1 set forth in the foregoing description, now the method for kneading a stiff-consistency concrete comprising less water is explained hereinafter. As shown in FIG. 1, each of the pusher bodies 2, 3, 5, 6 is retracted at an initial position, and the upper pusher body 4 is removed at the beginning so that a concrete material 13 is entered from the upper open end into the kneading tank 1. The concrete material 13 is accumulated up to a lower edge of a passage zone in which the side pusher bodies 5 and 6 move back and forth, and after finishing loading of the concrete, the upper pusher body 4 is set to close the open end of the kneading tank 1, as shown in FIG. 2.

Figure 3:
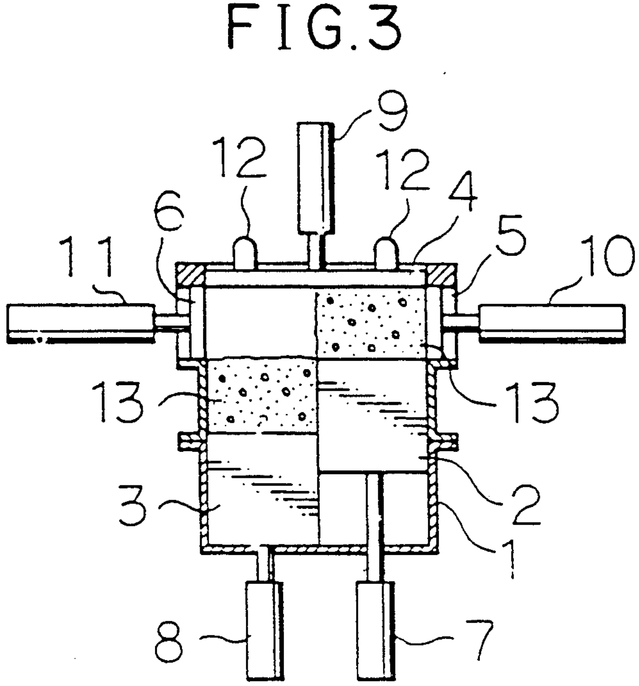
FIG. 3 is a vertical cross-sectional elevation view showing one state of the kneading step in accordance with the present invention.
Figure 4:
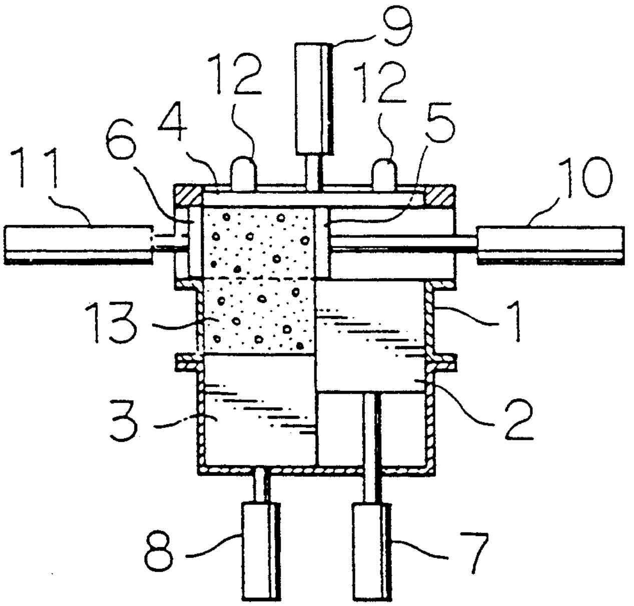
FIG. 4 is a vertical cross-sectional elevation view showing one state of the kneading step in accordance with the present invention.

And then, as shown in FIG. 3, a rod of a right lower pusher cylinder 7 is expanded upward to lift the lower pusher body 2 together with the concrete material 13 accumulated on the lower pusher body 2 so that the concrete material 13 is cut side by side in the vertical direction and divided into two sections, i.e., one concrete material section 13 accumulated on the lower pusher body 2 and the other concrete material section 13 on the lower pusher body 3 which stays adjacent to the lower pusher body 2 without being lifted. After the concrete material 13 accumulated on the lower pusher body 2 is lifted until it rises in front of the side pusher body 5, the side pusher body 5 is advanced by actuating the side cylinder 10 to expand its rod as shown in FIG. 4, whereby the concrete material 13 accumulated on the lower pusher body 2 can be laid on the concrete material 13 accumulated on the lower pusher body 3.

Figure 5:
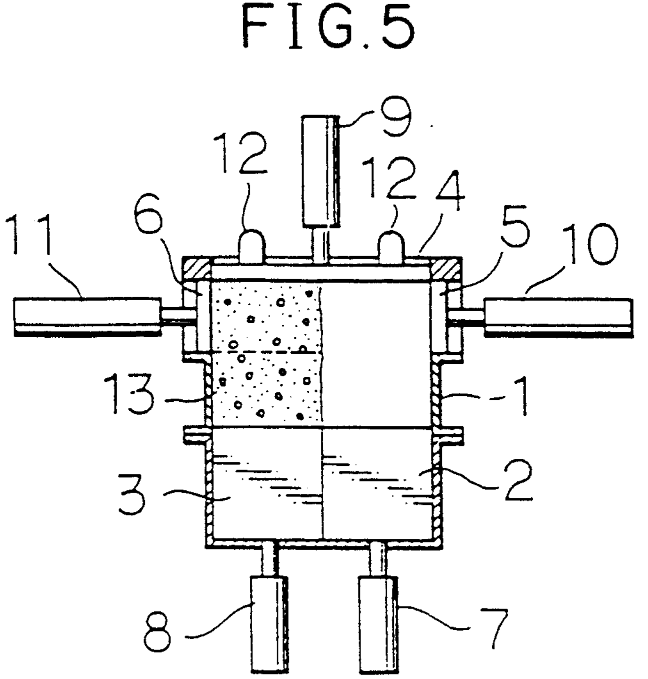
FIG. 5 is a vertical cross-sectional elevation view showing one state of the kneading step in accordance with the present invention.
Figure 6:
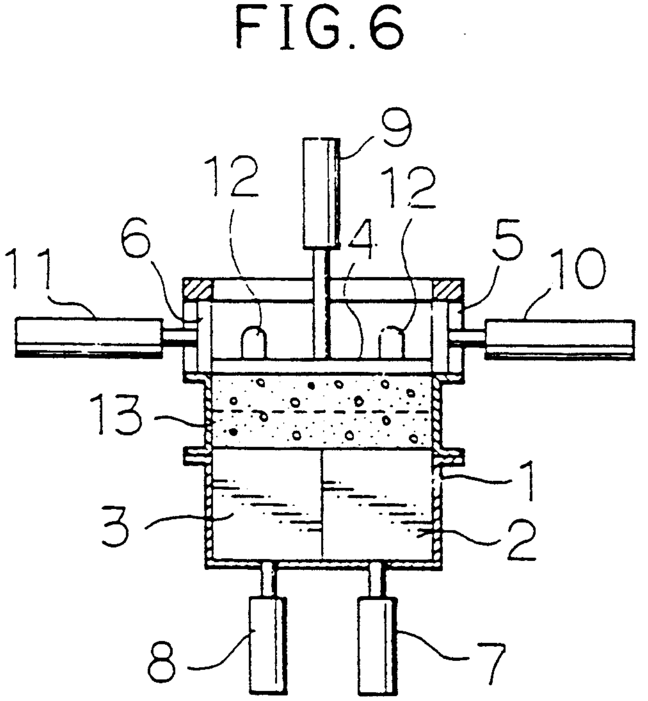
FIG. 6 is a vertical cross-sectional elevation view showing one state of the kneading step in accordance with the present invention.

Then, the side pusher body 5 and the lower pusher body 2 are retracted or returned to the initial position as shown in FIG. 5, and the upper pusher body 4 is lowered by actuating the upper pusher cylinder 9 to expand the rod of the upper pusher body 4, thus said laid up concrete material 13 is compacted. In other words, pushed downward and extended on the bottom portion of the kneading tank 1 as shown in FIG. 6, and, if necessary, the vibration machine 12 is utilized for the compaction during kneading of the concrete material 13.

With this first cycle, the concrete material 13, which was originally one layer, is divided into two parts in the right-and-left direction and is further compacted by two layers in the up-and-down direction.

Figure 7:
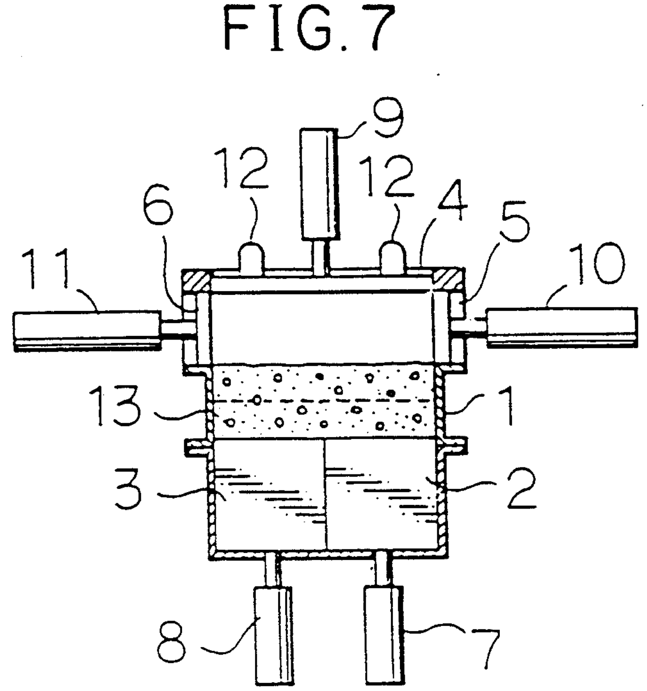
FIG. 7 is a vertical cross-sectional elevation view showing one state of the kneading step in accordance with the present invention.
Figure 8:
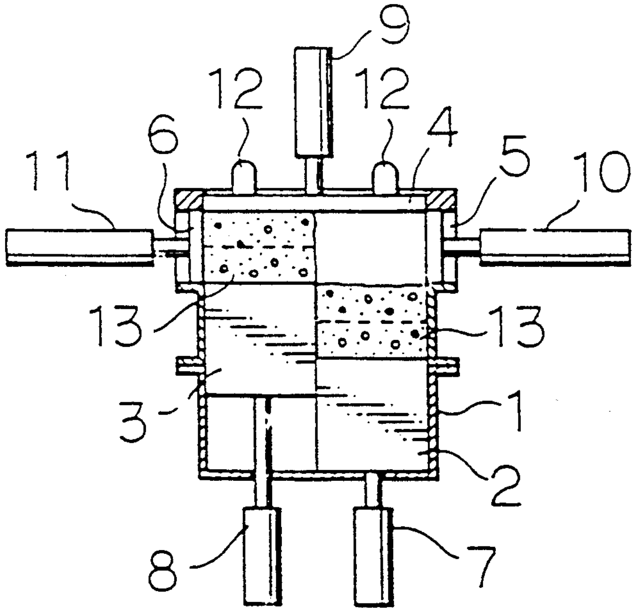
FIG. 8 is a vertical cross-sectional elevation view showing one state of the kneading step in accordance with the present invention.
Figure 9:
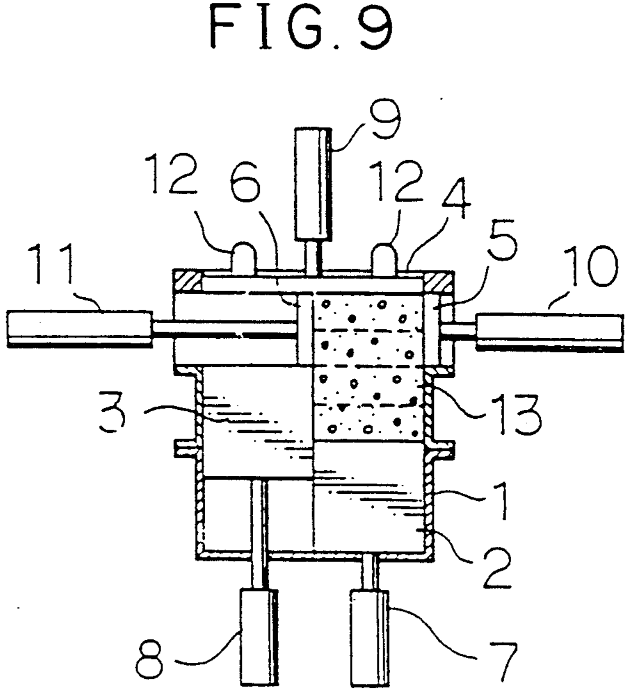
FIG. 9 is a vertical cross-sectional elevation view showing one state of the kneading step in accordance with the present invention.

Furthermore, as shown in FIG. 7, the upper pusher body 4 is lifted upward or retracted to the original position and then, as shown in FIG. 8, a rod of a left lower pusher cylinder 8 is expanded upward to lift the lower pusher body 3 together with the concrete material 13 accumulated on the lower pusher body 3 so that the concrete material 13 is cut side by side in the vertical direction and divided into two sections, i.e., one concrete material section 13 accumulated on the lower pusher body 3 and the other concrete material section 13 on the lower pusher body 2 which stays adjacent to the lower pusher body 3 without being lifted. After the concrete material 13 accumulated on the lower pusher body 3 is lifted until it rises in front of the side pusher body 6, the side pusher body 6 is advanced by actuating the side cylinder 11 to expand its rod, as shown in FIG. 9 , so that the concrete material 13 accumulated on the lower pusher body 3 can be laid on the concrete material 13 accumulated on the lower pusher body 2.

Figure 10:
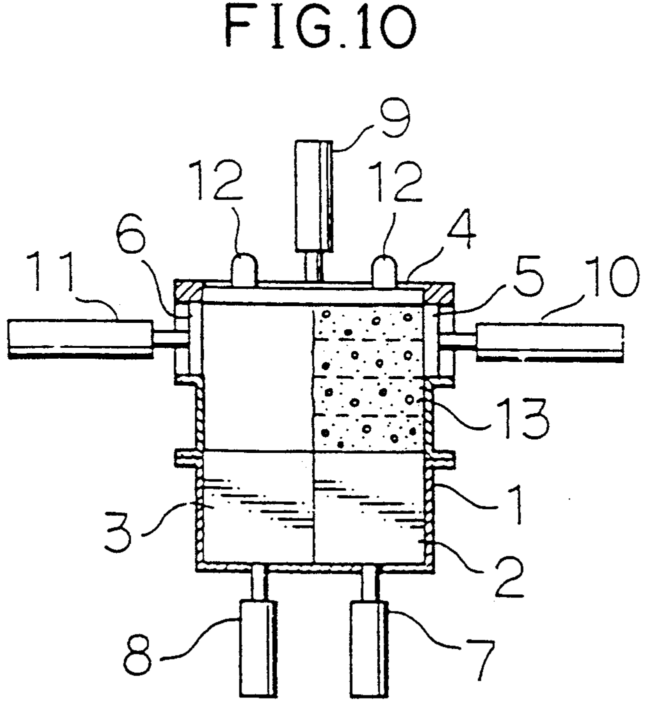
FIG. 10 is a vertical cross-sectional elevation view showing one state of the kneading step in accordance with the present invention.
Figure 11:
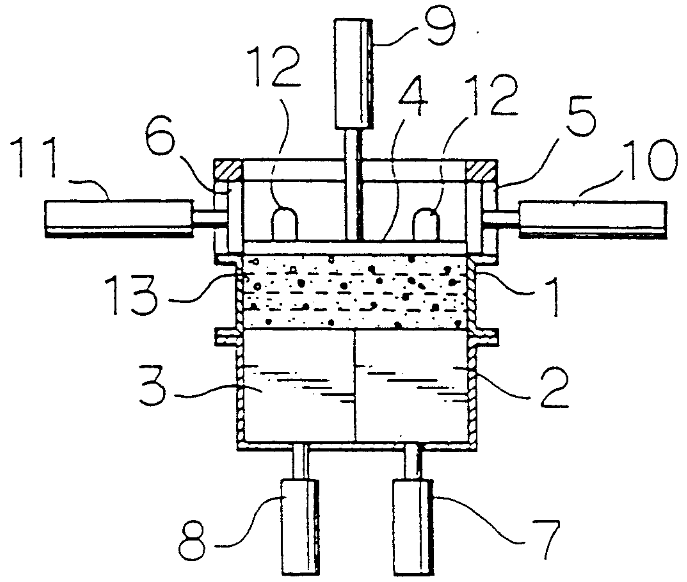
FIG. 11 is a vertical cross-sectional elevation view showing one state of the kneading step in accordance with the present invention.
Figure 12:
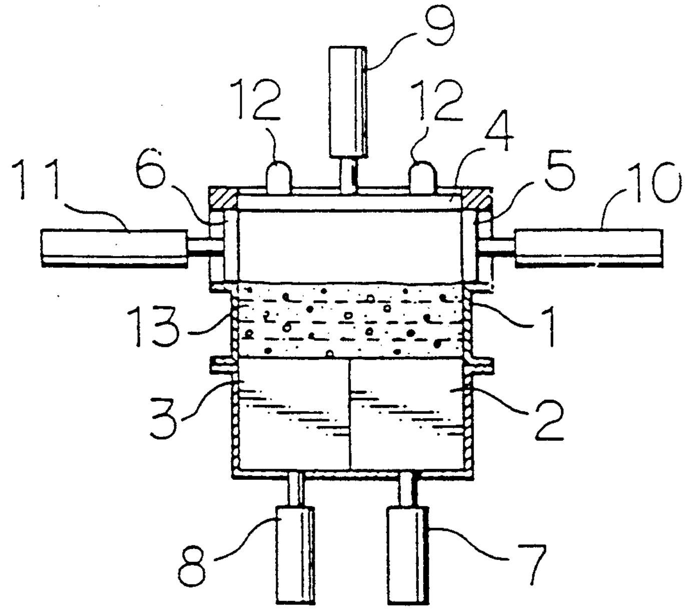
FIG. 12 is a vertical cross-sectional elevation view showing one state of the kneading step in accordance with the present invention.

Then, in the same way as the first cycle performed in the righthand operation Which is explained in the foregoing description, the side pusher body 6 and the lower pusher body 3 are retracted or returned to the initial position as shown in FIG. 10, and the upper pusher body 4 is lowered by actuating the upper pusher cylinder 9 to expand the rod of the upper pusher body 4. Thus, said laid up concrete material 13 is compacted, in other words pushed downward and extended on the bottom portion of the kneading tank 11 as shown in FIG. 11, and, if necessary, the vibration machine 12 is utilized for the compaction during kneading of the concrete material 13.

With this second cycle, the concrete material 13, which was originally two foyers at the time after just finishing the first cycle, is further divided into two parts in the right-and-left direction and then is compacted by four layers in the up-and-down direction.

Accordingly, if these righthand operations and lefthand operations, i.e., the first cycle and the second cycle, are performed alternatively and repeatedly, the concrete material is repeatedly divided into two parts, arrayed side by side in the right-and-left direction and then compacted in the up-and-down direction by a plurality of layers. Thus, the concrete material can be evenly kneaded.

Namely, it is theoretically explained as follows: for example, if the thickness of the concrete material 13 entered into the kneading tank 1 was originally 30 cm, the thickness of one layer becomes 0.03 cm at the time just after the above cycle is repeatedly performed 10 times, and further it is finally reduced to $2.8\times10^{-8}$ cm, which is substantially equal to the thickness of the water molecule at the time after further 30 times repetition of said cycle.

Accordingly, it becomes possible to evenly and surely knead any type of concrete regardless of water amount comprised therein if the above-described cycle is carried out repeatedly, in which cycle the concrete material 13 is repeatedly cut and divided into a plurality of sections arrayed side by side in the right-and-left direction and then compacted in the up-and-down direction by a plurality of layers so that the concrete material can be evenly kneaded.

By the way, though the embodiment explained in the foregoing description adopts two lower pusher bodies for dividing the concrete material into two parts, it is also possible to adopt three or more lower pusher bodies so as to cut and divide the concrete material into three or more parts. Further, it is also possible to provide side pusher bodies corresponding to these divided parts so that three or more layers can be compacted by the upper pusher body at the same time in only one cycle.

What is claimed is:

1. A kneading apparatus for concrete, comprising:

a kneading tank for receiving a layer of concrete material, said kneading tank having a bottom seat, side walls and a top portion;

a plurality of lower pusher bodies provided at said bottom seat of said kneading tank arrayed side by side in a horizontal direction for alternate movement in a vertical direction, said lower pusher bodies having pusher surface areas substantially equal to one another, the total of said pusher surface areas being substantially equal to an entire horizontal cross-sectional area of said kneading tank;

an upper pusher body having a pusher surface area which is substantially equal to said entire horizontal cross-sectional area of said kneading tank, said upper pusher body being provided at said top portion of said kneading tank so as to be movable in said vertical direction;

side pusher bodies provided at said side walls of said kneading tank which face each other and are movable in the horizontal direction to define a passage zone; and actuating means for driving said plurality of lower pusher bodies, said upper pusher body and said side pusher bodies.

2. A kneading apparatus in accordance with claim 1 wherein said actuating means comprises a cylinder device which is expandable by hydraulic force.

3. A kneading apparatus in accordance with claim 1 wherein said bottom seat has two of said lower pusher bodies, each of said lower pusher bodies having said pusher surface area which is approximately one-half of said entire horizontal cross sectional area of said kneading tank, said lower pusher bodies being separately raised or lowered by said actuating means within a predetermined stroke wherein the highest position of said lower pusher surface area of said lower pusher bodies when actuated is substantially equal to the lowest portion of said passage zone, said lower pusher bodies having a vertical length longer than said predetermined stroke.

4. A kneading apparatus in accordance with claim 1 wherein each of said side pusher bodies have a pusher surface area which is substantially equal to an upper half of an entire vertical cross-sectional area of said kneading tank, said side pusher bodies alternately moving back and forth in the horizontal direction from said side walls of said kneading tank to an approximately center position of said kneading tank.

5. A kneading apparatus in accordance with claim 1 further comprises a vibrating machine connected to said upper pusher body to provide vibration to said concrete material when said upper pusher body downwardly presses said concrete material.

6. A kneading apparatus in accordance with claim 1 wherein said actuating means comprises a cylinder device which is expandable by motor power.

7. A kneading apparatus for concrete, comprising:

a kneading tank for receiving a layer of concrete material, said kneading tank having a bottom seat, side walls and a top portion;

a plurality of lower pusher bodies provided at said bottom seat of said kneading tank arrayed side by side in a horizontal direction for alternate movement in a vertical direction, said lower pusher bodies having pusher surface areas substantially equal to one another, the total of said pusher surface areas being substantially equal to an entire horizontal cross-sectional area of said kneading tank, said lower pusher bodies being separately raised or lowered within a predetermined stroke;

an upper pusher body having a pusher surface area which is substantially equal to said entire horizontal cross-sectional area of said kneading tank, said upper pusher body being provided at said top portion of said kneading tank so as to be movable in said vertical direction;

side pusher bodies provided at said side walls of said kneading tank which face each other and are movable in the horizontal direction to define a passage zone; wherein the highest position of said lower pusher surface area of said lower pusher bodies when actuated is substantially equal to the lowest portion of said passage zone, said lower pusher bodies having a vertical length lower than said predetermined stroke and actuating means for driving said plurality of lower pusher bodies, said upper pusher body and said side pusher bodies.

8. A kneading apparatus for concrete, comprising:

a kneading tank for receiving a layer of concrete material, said kneading tank having a bottom seat, side walls and a top portion;

a plurality of lower pusher bodies provided at said bottom seat of said kneading tank arrayed side by side in a horizontal direction for alternate movement in a vertical direction, said lower pusher bodies having pusher surface areas substantially equal to one another, the total of said pusher surface areas being substantially equal to an entire horizontal cross-sectional area of said kneading tank;

an upper pusher body having a pusher surface area which is substantially equal to said entire horizontal cross-sectional area of said kneading tank, said upper pusher body being provided at said top portion of said kneading tank so as to be movable in said vertical direction;

side pusher bodies provided at said side walls of said kneading tank which face each other and are movable in the horizontal direction, each of said side pusher bodies having a pusher surface area which is substantially equal to an upper half of an entire vertical cross-sectional area of said kneading tank, said side pusher bodies alternately moving back and forth in the horizontal direction from said side walls of said kneading tank to an approximately center position of said kneading tank; and actuating means for driving said plurality of lower pusher bodies, said upper pusher body and said side pusher bodies.

* * * * *

UNITED STATES PATENT AND TRADEMARK OFFICE

CERTIFICATE OF CORRECTION

PATENT NO. : 5,302,018

DATED : April 12, 1994

INVENTOR(S) : Kenji Maeda

It is certified that error appears in the above-indentified patent and that said Letters Patent is hereby corrected as shown below:

Claim 7, in column 6, line 34, change "a vertical length lower than" to -- a vertical length longer than --.

Signed and Sealed this

Eighteenth Day of October, 1994

Attest:

BRUCE LEHMAN

Attesting Officer

*Commissioner of Patents and Trademarks*